United States Patent
Sava et al.

(10) Patent No.: US 10,420,161 B1
(45) Date of Patent: Sep. 17, 2019

(54) CONTROLLING RF COMMUNICATION IN A DUAL-CONNECTIVITY SCENARIO

(71) Applicant: Sprint Spectrum L.P., Overland Park, KS (US)

(72) Inventors: Herkole Sava, Centreville, VA (US); Mike Witherell, Portland, OR (US); Ankit Muchhala, Leesburg, VA (US); Zheng Fang, Mclean, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/926,607

(22) Filed: Mar. 20, 2018

(51) Int. Cl.
*H04W 72/08* (2009.01)
*H04W 76/15* (2018.01)
*H04W 88/06* (2009.01)
*H04W 24/10* (2009.01)

(52) U.S. Cl.
CPC ......... *H04W 76/15* (2018.02); *H04W 72/085* (2013.01); *H04W 24/10* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 9,473,286 B1 | 10/2016 | Shipley et al. | |
| 2002/0177465 A1* | 11/2002 | Robinett | H04B 1/005 455/552.1 |
| 2008/0043677 A1 | 2/2008 | Kim et al. | |
| 2008/0139123 A1* | 6/2008 | Lee | H04B 1/406 455/63.1 |
| 2008/0188184 A1 | 8/2008 | Nogami et al. | |
| 2009/0219904 A1* | 9/2009 | Khairmode | H04W 88/06 370/338 |
| 2012/0088455 A1 | 4/2012 | Love et al. | |
| 2012/0115416 A1* | 5/2012 | Yucek | H04B 1/109 455/41.2 |
| 2012/0213095 A1 | 8/2012 | Krishnamurthy et al. | |
| 2012/0320769 A1 | 12/2012 | Callender | |
| 2013/0194938 A1 | 8/2013 | Immonen et al. | |
| 2013/0315085 A1 | 11/2013 | Krishnamurthy et al. | |
| 2014/0050146 A1 | 2/2014 | Chrisikos et al. | |
| 2015/0141068 A1 | 5/2015 | Immonen et al. | |
| 2015/0341945 A1 | 11/2015 | Panchal | |
| 2018/0109282 A1* | 4/2018 | Khan | H04B 1/40 |
| 2018/0288657 A1* | 10/2018 | Stojanovski | H04W 36/0055 |
| 2018/0376383 A1* | 12/2018 | Belghoul | H04W 36/0022 |
| 2019/0069205 A1* | 2/2019 | Lee | H04W 36/00835 |

* cited by examiner

*Primary Examiner* — Kodzovi Acolatse

(57) ABSTRACT

Disclosed are structures and processes to help enable a wireless communication device (WCD) to support operation in a dual-connectivity scenario, such as where the WCD operates concurrently with 4G and 5G wireless connections over frequency channels in a common frequency band. Downlink low-noise-amplification could be controlled with a split dual-stage arrangement and control communication between modems in the WCD. And uplink maximum-power reduction could be controlled based on an evaluation of the frequency channels used by the respective connections, given knowledge of frequency resources allocated for one of those connections, and with a presumed worst-case-scenario frequency-resource allocation on the other connection.

13 Claims, 4 Drawing Sheets

CONTROLLING RF COMMUNICATION IN A DUAL-CONNECTIVITY SCENARIO

BACKGROUND

A cellular wireless network typically includes a number of base stations that are configured to provide wireless coverage areas, such as cells and cell sectors, in which wireless communication devices (WCDs) such as cell phones, tablet computers, tracking devices, embedded wireless modules, and other wirelessly equipped communication devices (whether or not user operated), can operate. In turn, each base station could be coupled with network infrastructure that provides connectivity with one or more transport networks, such as the public switched telephone network (PSTN) and/or the Internet for instance. With this arrangement, a WCD within coverage of the network could engage in air interface communication with a base station and could thereby communicate via the base station with various remote network entities or with other WCDs served by the base station.

Such a network could operate in accordance with a particular air interface protocol (or radio access technology), with communications from the base stations to WCDs defining a downlink or forward link and communications from the WCDs to the base stations defining an uplink or reverse link.

In accordance with the air interface protocol, each coverage area could operate on a carrier, which could be frequency division duplex (FDD), defining separate frequency channels for downlink and uplink communication, or time division duplex (TDD), with a single frequency channel multiplexed over time between downlink and uplink use. Further, on the downlink and uplink, the carrier could be structured to define various physical channels for carrying information between the base stations and WCDs.

Over the years, the industry has embraced various "generations" of air interface protocols, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

As the industry advances from one generation of wireless air interface technology to the next, issues arise with the need for WCDs to support potentially multiple air interface protocols at once. With the transition from 4G to 5G, for instance, it is expected that WCDs will be configured to support use of both technologies concurrently, with an arrangement referred to as EUTRA-NR Dual Connectivity (EN-DC). With such an arrangement, a WCD might include a 4G radio and a 5G radio, with the 4G radio being served by a 4G base station concurrently with the 5G radio being served by a 5G base station. This arrangement could help support transition from 4G technology to 5G technology and may provide other benefits as well.

OVERVIEW

Disclosed are methods and systems to help address technological issues associated with implementing multiple radios concurrently in a WCD, especially in a scenario where the radios operate in the same frequency band and share a radio frequency (RF) receive chain. This situation may arise, for instance, as the industry transitions from 4G to 5G NR.

To support the 4G to 5G transition, a WCD could be configured with discrete 4G and 5G modems that are set to operate on respective carriers in a common frequency band. Each modem could include RF intermediate circuitry (RFIC) and a baseband modem interconnected over an I/Q bus. In the receive (downlink) direction, the device could have a single RF chain including one or more receive antennas, a bandpass filter for the common frequency band, with the receive signal passing to both the 4G modem and 5G modem for processing. And in the transmit (uplink) direction, the device could have a separate RF transmit chain respectively for each modem.

With such an arrangement, the WCD could be set to support EN-DC, with its 4G modem operating as a master controller and its 4G air interface connection functioning as an anchor. For instance, the WCD could use its 4G modem to acquire a 4G radio-link-layer connection (e.g., Radio Resource Configuration (RRC) connection) with a 4G base station (evolved Node B (eNodeB)), and RRC signaling over that connection could then provide for setup of a 5G radio-link-layer connection between the WCD's 5G modem and a 5G eNodeB, likely collocated with the 4G eNodeB. Once these two radio-link-layer connections are established, data communication on each connection can operate with its own respective physical layer, media access control (MAC) layer, and radio-link-control (RLC) layer processing, such as to facilitate scheduling of communications, channel state reporting, and the like.

The disclosed methods and systems may be particularly useful in managing dual connectivity in this situation, but may have broader applicability as well.

One issue presently addressed is how a WCD can be configured to handle downlink communications that pass through a common RF receive chain but are destined for separate modems. In practice, the WCD's receive chain may include a low-noise amplifier (LNA) for amplifying a possibly weak received signal so as to facilitate modem processing of the signal. However, signals that the WCD receives on two separate downlink channels for the two different air interface protocols may differ in signal strength from each other for various reasons, such as due to differences in path loss. Further, the modems may differ in their respective optimal receive signal strengths. Given this, at issue is how to configure the WCD to best accommodate both modems.

Another issue presently addressed is how a WCD can be configured to handle uplink communications, taking into account interference issues that could arise as a result of the WCD engaging in possibly concurrent transmission on the two uplink channels associated with the two separate air interface protocols. For instance, industry or government regulations may place restrictions on a WCD's uplink transmission in certain frequency bands, to help minimize out-of-band (OOB) emissions that could adversely impact other communications. With dual-connectivity, however, a WCD's concurrent uplink transmission on two separate channels in a common frequency band could combine to produce reverse intermodulation distortion (IMD) products, the transmission of which could be contrary to regulations.

Disclosed is a wireless communication device (WCD) with dynamic control of dual-stage split amplification.

The WCD includes at least two modems, including a first modem supporting wireless communication according to a first air interface protocol (e.g., 4G) and a second modem supporting wireless communication according to a second air interface protocol (e.g., 5G NR). Further, the WCD includes a common RF receive chain shared by the two modems, the common RF receive chain including (i) a common set of antennas and filter for receiving downlink communications in a common frequency band on the first air interface protocol and the second air interface protocol and (ii) a common LNA (cLNA) for amplifying the received downlink communications, wherein the first modem is configured to control gain of the cLNA.

The WCD then includes a splitter for splitting output from the common RF receive chain into a first path to the first modem and a second path to the second modem. And the WCD includes a first LNA in the first path, wherein the first modem is configured to control gain of the first LNA, and a second LNA in the second path, wherein the second modem is configured to control gain of the second LNA, and the second modem is configured to engage in signaling with the first modem to trigger adjustment by the first modem of the gain of the cLNA.

In accordance with example embodiments, the second modem in such a WCD could be configured to detect (i) that communications being received at the second modem via the second path are saturated and (ii) that adjustment of the second LNA is unable to overcome that saturation, such as because the second modem has already reduced gain of the second LNA to zero, or because the incoming communications are distorted from saturation regardless of any possible further adjustments of gain of the second LNA. Further, the second modem could be configured to respond to detecting this situation by engage in the signaling with the first modem to trigger the adjustment by the first modem of the gain of the cLNA. The adjustment of the gain of the cLNA could then comprise reducing the gain of the cLNA from a predefined default gain level (e.g., about 17-18 dB) to a predefined reduced gain level (e.g., about 12-13 dB).

Further, the first modem could be configured to detect (i) that communications being received at the first modem via the first path are saturated and (ii) that adjustment of the first LNA is unable to overcome that saturation, such as for reasons similar to those noted above. And the first modem could be configured to respond to detecting this situation by adjusting the gain of the cLNA, similarly such as by reducing the gain of the cLNA from the predefined default gain level to the predefined reduced gain level.

In addition, the first modem could be configured to control whether the cLNA is on (e.g., applying any amplification) based on the state of dual-connectivity of the WCD. For instance, the first modem could be configured to turn on the cLNA in response to the first modem determining that the WCD operating in a dual-connectivity mode in which the first modem has a first radio-link connection with a first base station and the second modem has a second radio-link with a second base station. The first modem could detect this state, as the first modem could be the anchor for establishing the dual connectivity as noted above.

Further, the first modem could be configured to set the gain of the cLNA to the predefined default gain level. And the first modem could be configured to reduce the gain of the cLNA to the predefined reduced gain level in response to one or more trigger events, such as (i) the first modem detecting saturation of communications arriving at the first modem via the first path when the gain of the first LNA is already threshold low and/or (ii) the second modem detecting saturation of communications arriving at the second modem via the second path when the gain of the second LNA is already threshold low.

Yet further, the first modem could be configured to turn off the cLNA, e.g., to conserve battery power if applicable, in response to the WCD handing over from the common frequency band to another frequency band. Here again, the first modem could be privy to this handover, as the first modem may be the anchor for the dual connectivity and may thus not only be aware of the frequency band on which it is set to communicate but may also be aware of the frequency band on which the second modem is set to communicate.

Additionally in accordance with example embodiments, disclosed is a WCD with dynamic control of uplink transmission power.

The WCD includes at least two modems, including a first modem supporting wireless communication according to a first air interface protocol (e.g., 4G) and a second modem supporting wireless communication according to a second air interface protocol (e.g., 5G NR). Further, the WCD includes a first power amplifier for amplifying uplink transmissions from the first modem, wherein the first modem controls gain of the first power amplifier and applies a first maximum-power reduction in setting a maximum output power of the first amplifier. And the WCD includes a second power amplifier for amplifying uplink transmissions from the second modem, wherein the second modem controls gain of the second power amplifier and applies a second maximum-power reduction in setting a maximum output power of the second amplifier.

In accordance with the disclosure, the first modem of such a WCD is configured to adjust the first maximum-power reduction based on (a) which uplink frequency channel the first modem is operating on, (b) which uplink frequency channel the second modem is operating on, and (c) which uplink frequency resources the first modem will be transmitting on in the uplink frequency channel on which the first modem is operating.

And the first modem is configured to do this without actual knowledge of which uplink frequency resources the second modem will be transmitting on in the uplink frequency channel on which the second modem is operating. For instance, this could occur on a per transmission-time-interval (TTI) basis, such as every 1-millisecond scheduling interval, in which case it may not be practical or possible for the first modem to learn quickly enough which uplink frequency resources the second modem will be transmitting on in the uplink frequency channel on which the second modem is operating, and so the first modem could assume a worst case scenario—i.e., that the second modem will be transmitting on uplink frequency resources that will cause the most IMD or other issue given the uplink frequency resources that the first modem knows it will itself be transmitting on in the uplink frequency channel on which the first modem is operating.

In practice, the first modem could include or have access to mapping data that specifies pairings of uplink frequency channels, and the first modem could be configured to refer to that mapping data to determine how much to adjust the first maximum-power reduction, given (a) information indicating which uplink frequency channel the first modem is operating on, (b) which uplink frequency channel the second modem is operating on, and (c) which uplink frequency resources the first modem will be transmitting on in the uplink frequency channel on which the first modem is operating.

In an example implementation, the first modem could be configured to use the mapping data to make a first determination of whether a pairing of the uplink channel on which the first modem is operating and the uplink channel on which the second modem is operating is a candidate pairing for adjusted maximum-power reduction, e.g., with the mapping data establishing that there is at least one pairing of uplink frequency resources on its channel and the second modem's channel that could require adjusted maximum-power reduction. And the first modem could be configured to respond to the first determination being affirmative by then making a second determination, based on the uplink frequency resources the first modem will be transmitting on, of how much to adjust the first maximum-power reduction, e.g., by determining from the mapping data what the greatest such adjustment would be.

As such, the second determination of how much to adjust the first maximum-power reduction could be based on a presumption of a worst case pairing of (i) uplink frequency resources on which the first modem will be transmitting and (ii) uplink frequency resources on which the second modem will be transmitting concurrently. For instance, if the mapping data establishes various maximum-power reductions for the uplink resources on which the first modem will be transmitting, corresponding respectively with various uplink resources on which the second modem will be transmitting, the first modem could determine the greatest such indicated adjustment as the extent to which the first modem should adjust its maximum-power reduction.

Further in accordance with example embodiments, disclosed are methods for dynamically controlling dual-stage split amplification in a WCD, and for dynamically controlling uplink transmission power in such a WCD, in line with the configurations discussed above.

For instance, disclosed is a method for dynamic control of dual-stage split amplification in a WCD configured as discussed above. The disclosed method includes the second modem detecting (i) saturation of communications being received at the second modem via the second path and (ii) that adjustment of the second LNA is unable to overcome the saturation. Further, the method includes the second modem responding to the detecting by signaling to the first modem. And the method includes the first modem responding to the signaling by adjusting the gain of the cLNA to help overcome the detected saturation of communications being received at the second modem.

Here again, adjusting the gain of the cLNA could involve reducing the gain of the cLNA from the predefined default gain level to the predefined reduced gain level. For instance, the first modem could be programmed with indications of these predefined levels and could set and adjust the gain of the cLNA accordingly.

Further, the method could additionally include the first modem adjusting gain of the cLNA in response to the first modem detecting (i) saturation of communications being received at the first modem via the first path and (ii) that adjustment of the first LNA is unable to overcome the saturation of communications being received at the first modem via the first path. And the method could include the first modem turning on the cLNA in response to the WCD operating in a dual-connectivity mode in which the first modem has a first radio-link connection with a first base station and the second modem has a second radio-link with a second base station, and the first modem turning off the cLNA in response to the WCD handing over from the common frequency band to another frequency band.

These as well as other aspects and advantages will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

Figure 1:
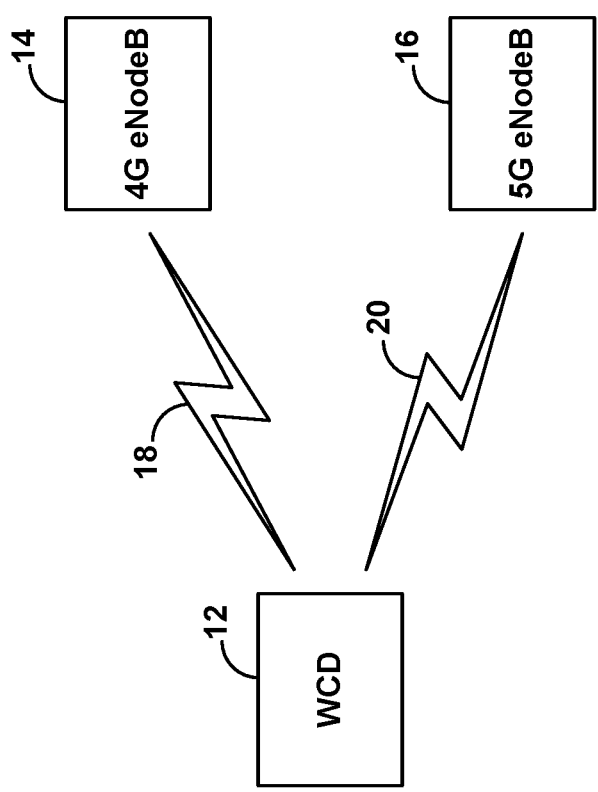
FIG. 1 is a simplified block diagram of an example network arrangement in which aspects of the present disclosure can be implemented.

An example implementation will now be described in the context of dual-connectivity with 4G LTE and 5G NR, where a WCD operates on those two air interface protocols concurrently in a common frequency band, e.g., operating on a respective TDD 4G carrier in the band while operating on a separate respective TDD 5G carrier in the same band. However, it will be understood that principles disclosed herein could be extended to apply with respect to other dual-connectivity scenarios, such as with respect to other air interface protocols, and possibly with the WCD operating on the air interface protocols on channels in separate frequency bands.

Further, even within the context of a representative 4G-5G dual-connectivity scenario, it will be understood that numerous variations from the specific arrangements and processes described are possible. For instance, various described circuits, connections, functions, and other elements could be added, omitted, distributed, re-located, re-ordered, combined, or changed in other ways.

Example Network and Device Configuration

As noted above, FIG. 1 is a simplified block diagram of an example network arrangement in which aspects of the present disclosure can be implemented. Shown in the figure is a representative WCD 12, which could be any of the types of devices noted above or others now known or later developed. The WCD is shown in coverage of a 4G eNodeB 14 and also within coverage of a 5G eNodeB 16. Though shown separately in the figure, the 4G eNodeB and 5G eNodeB could be collocated, such as being implemented with a common base station antenna tower and separate 4G and 5G base station radios. Alternatively, the two eNodeBs could be positioned separately.

In the arrangement shown, the 4G eNodeB provides a 4G air interface 18, and the 5G eNodeB provides a 5G air interface 20. In an example implementation, each of these air interfaces could be structured to use Orthogonal Frequency Division Multiple Access (OFDMA) on its downlink and Single-Carrier Frequency Division Multiple Access (SC-FDMA) on its uplink, but the specific structure and operation of these air interfaces may differ. For example, the 5G air interface may support variable subcarrier spacing and other advanced features associated with possible 5G NR operation, and the 5G air interface may support other features that the 4G air interface does not.

As shown, the representative eNodeBs are in communication with each other through a network interface, which enables the eNodeBs to interoperate, to help support dual-connectivity operation of WCDs such as WCD 12. Further, although not shown, each eNodeB could be interconnected with network infrastructure (e.g., a core access network), such as one or more gateways, controllers, and the like, providing connectivity with one or more transport networks such as the Internet for instance, so as to enable WCDs such as WCD 12 to engage in wireless communication on the transport network(s) and perhaps with other served WCDs.

Figure 2:
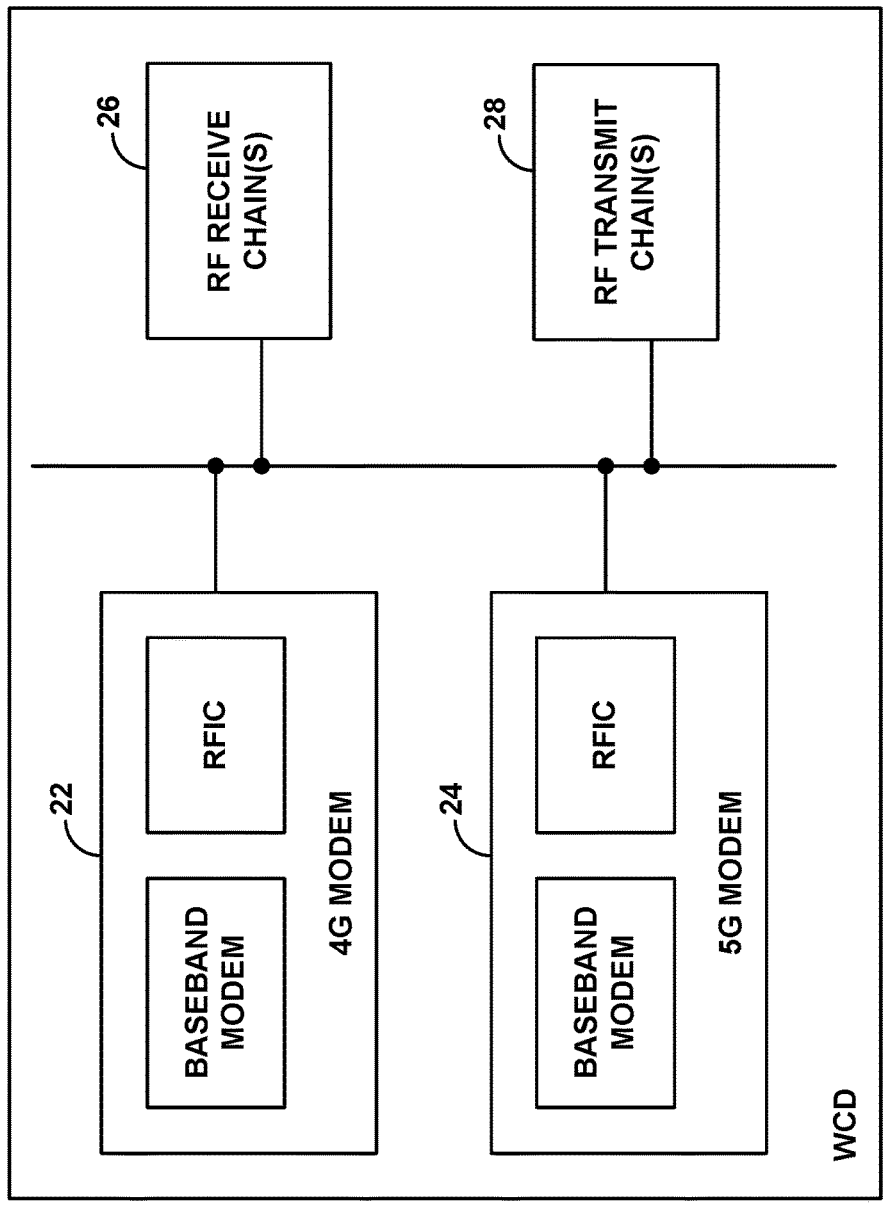
FIG. 2 is a simplified block diagram of an example WCD.

FIG. 2 is next a simplified block diagram showing some of the components that can be included in a representative WCD such as WCD 12, to facilitate dual-connectivity service. As shown, the WCD includes a 4G modem 22 and a 5G modem 24. These modems could be provided on a common integrated circuit chipset within the WCD or, perhaps more likely in an initial implementation, on separate chipsets within the WCD. In either case, the modems could be interconnected by a signaling channel (e.g., bus) within the WCD, enabling the modems to engage in signaling communication with each other.

Each modem is optimally configured to operate according to its respective air interface protocol. Further, each modem is optimally configured to carry out operations as presently disclosed. To facilitate carrying out these and other features, each modem could include a processing unit (e.g., one or more microprocessors), non-transitory data storage (e.g., one or more volatile and/or non-volatile storage components, such as flash or EEPROM storage), and program instructions stored in the data storage and executable by the processing unit to implement the disclosed features. Further, each modem could further include various components and interconnections to enable the modem to interoperate with other components of the WCD, to further facilitate carry out various disclosed features.

In the simplified arrangement shown, each modem includes a baseband modem for handling physical layer and MAC layer processing, such as modulation and coding, and each modem further includes an RFIC for interfacing with RF transmit and receive chains. Each modem's RFIC could be interfaced with the modem's baseband modem by an I/Q bus, for carrying I/Q symbols between the RFIC and the baseband modem. And each modem's RFIC could be responsible for analog-digital conversion to convert between over-the-air analog RF communications and digital representations of the communications that its baseband modem has processed or can process.

As further shown, the WCD includes one or more downlink RF receive chains 26 and one or more uplink RF transmit chains 28. These RF receive and transmit chains are shown in this figure as simplified blocks. In practice, the blocks could include various antennas, filters, amplifiers, splitters, and/or other components. And the antennas could include one or more antennas, with separate antennas provided for downlink and uplink communication and/or antennas shared between downlink and uplink communication. In a likely implementation, for instance, the WCD would include multiple downlink antennas and multiple uplink antennas, to facilitate robust air interface communication. But other arrangements are possible as well.

Each modem 22, 24 could support establishment of a respective radio-link-layer connection with its respective eNodeB, using procedures now known or later developed. In a representative dual-connectivity scenario, the 4G modem 22 could function as an anchor. The 4G modem could establish its own radio-link-layer connection (e.g., RRC connection) with the 4G eNodeB 14 first so as to enable the WCD to engage in 4G data communication served by the 4G eNodeB. (For instance, the WCD could engage in random access channel (RACH) signaling and then RRC signaling with the 4G eNodeB.) Through communication between the 4G eNodeB 14 and the 5G eNodeB 16, and through corresponding communication between the 4G modem 22 and the 5G modem, signaling to establish a 5G radio-link-layer connection between the 5G modem and the 5G eNodeB could then flow over the established 4G RRC connection.

Through this process, the WCD could thus have an established 4G connection between its 4G modem and the 4G eNodeB and, concurrently, an established 5G connection between its 5G modem and the 5G eNodeB. With these connections established, each respective eNodeB could serve the WCD according to the eNodeB's respective air interface protocol.

For instance, as each eNodeB has data to transmit to the WCD, the eNodeB could transmit over its respective connection to respective modem in the WCD a scheduling directive that indicates downlink frequency resources that will carry the data to the WCD, and could accordingly transmit the data over its respective connection to the WCD for ultimate receipt and processing by the respective modem in the WCD. And as the WCD has data to transmit over either of the connections to a respective eNodeB, the WCD could transmit over its respective connection to the eNodeB a scheduling request, the respective eNodeB could transmit over its respective connection to the WCD a scheduling directive that indicates uplink frequency resources on which the WCD is to transmit the data, and the WCD could accordingly transmit the data over its respective connection to the respective eNodeB, for ultimate receipt and processing by that eNodeB.

Under example 4G and 5G air interface protocols, air interface communication between a WCD and an eNodeB could occur on a per TTI basis as noted above. In particular, the air interface could be divided into a continuum of 10-millisecond frames, each subdivided into ten 1-millisecond subframes or TTIs. On a TDD carrier that defines a particular range of frequency multiplexed over time between downlink and uplink communication, certain TTIs per frame could be designated for downlink use, while other TTIs per frame could be designated for downlink use, according to a TDD-configuration or frame configuration. In a dual connectivity scenario, the 4G and 5G modems could each operate on a respective separate such TDD carrier, both of which may be in a common frequency band (such as band class 41 (BC41) or another), each having its own respective bandwidth defining its range of frequency, such as 5 MHz, 20 MHz, or perhaps much narrower or much wider.

Within each TTI, a given carrier's frequency bandwidth could then be divided into allocable physical resource blocks (PRBs), such as 180 kHz-wide blocks. These or other frequency resources might constitute the smallest allocable frequency resource segments for data communication, although variations may be possible. Thus, when either of the eNodeBs is going to schedule downlink or uplink communication between it and the respective modem in the WCD, the eNodeB could select one or more such PRBs within a given TTI and could send to the WCD a scheduling directive that directs the communication to occur in those PRBs of the respective air interface, using an indicated modulation and coding scheme and perhaps one or more other parameters (such as a designated MIMO order or the like), and the communication could then occur accordingly.

In addition, while each eNodeB is serving the WCD, the respective modem in the WCD may engage in a power control process with the eNodeB. For instance, for uplink communication by the respective modem in the WCD, the eNodeB could regularly evaluate uplink receive signal strength from the WCD and could send over its respective connection to the WCD power control commands (PCCs) to direct adjustments of the WCD's transmission power as necessary to help keep the uplink receive signal strength at a desired level.

Downlink Amplification Issue

In the RF receive path, a WCD such as WCD 12 would typically need an LNA to build up a possibly weak receive signal so as to facilitate modem-processing of the signal. In practice, each modem in the WCD could have a predefined optimal receive signal strength level and could be configured with predefined thresholds for the receive signal strength being too high (which could result in saturation and consequent distortion and inability to process the signal) and for the receive signal strength being too low (which could result in poor receiver sensitivity and inability or issues with processing). In practice, each modem's RFIC could evaluate the receive signal strength and inform the modem's baseband modem of the signal strength level and/or whether the level is too high or too low. If the level is too high or too low, the baseband modem could then signal over the MIPI bus to the LNA to correspondingly reduce or increase the LNA gain.

With the WCD having two separate modems as in the arrangement of FIG. 1, each modem may have a respective optimal receive signal strength. Assuming for sake of discussion that the serving 4G and 5G eNodeBs are collocated, the path loss for the 4G and 5G connections in the common frequency band may be similar, but variations are expected (perhaps differing by up to 8-10 dB) as the WCD moves around and due to differences in path loss as a result of the 4G and 5G air interface connections being on different frequency channels even if in a common frequency band. If an LNA is shared by these two modems by being provided in a common RF receive chain, then at issue is how to control the LNA gain in a manner that would work well for both of the modems given their different requirements for optimal receive signal strength.

As discussed above, the 4G modem (by way of example) could be configured as a master controller of the LNA gain, the 5G modem could engage in signaling communication with the 4G modem to request changes to the LNA gain when issues arise with the 5G receive signal strength level, and the 4G modem could accordingly direct adjustments of the LNA gain. Unfortunately, however, such changes to the LNA gain to accommodate the 5G modem could result in issues for the 4G modem, as the 4G modem could separately need to control the LNA gain for its own purposes, and vice versa.

Downlink Amplification Resolution

Per the present disclosure, a WCD having multiple modems and a shared RF receive chain will be configured with a dual-stage split LNA architecture. The RF signal output of a bandpass filter in the receive chain will be processed by a cLNA to amplify the signal when necessary with a first gain. The output of the cLNA will then be split into separate receive paths, one respectively for each modem. And each per-modem receive path will then have its own modem-specific LNA. For instance, in the 4G/5G arrangement discussed above, the 4G receive path could have a respective LNA ("4G LNA") and the 5G receive path could have a separate respective LNA ("5G LNA"). With this arrangement, as the 4G modem operates as a controller of the cLNA, the 4G modem and 5G modem could each also control the gain of their respective LNAs to help keep their receive signals strengths at suitable levels. A similar configuration could be provided with more than two modems as well.

Figure 3:
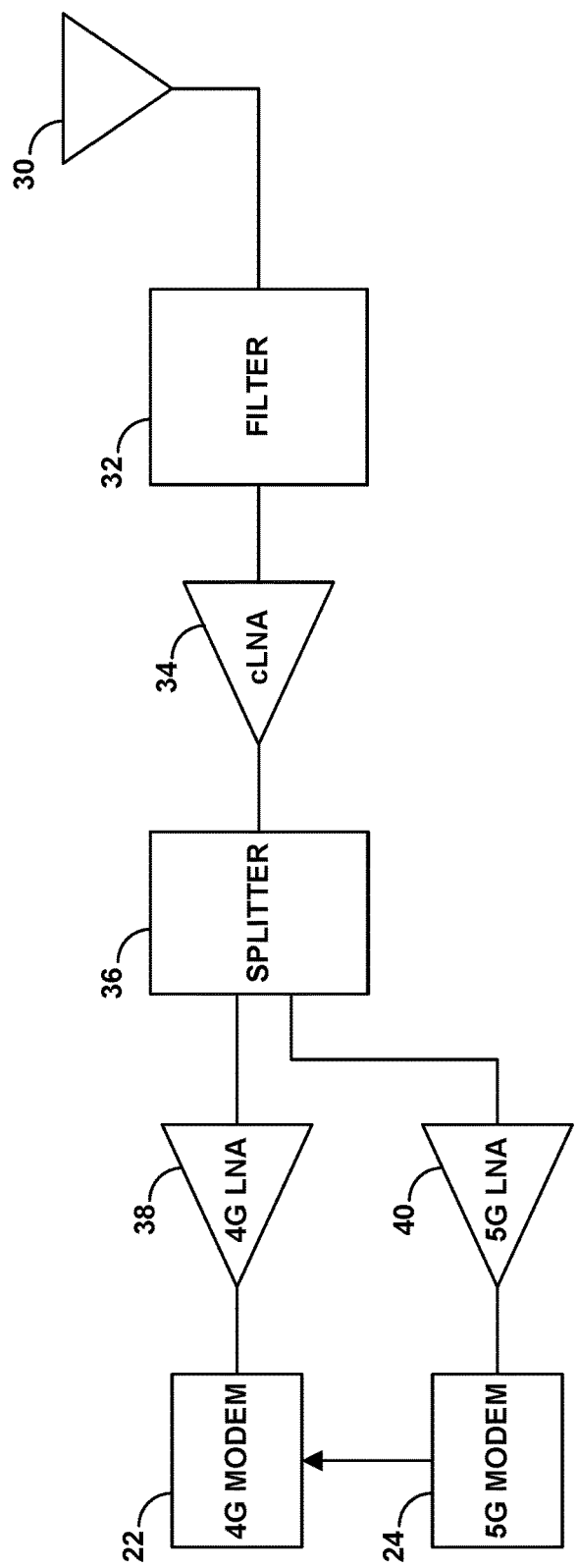
FIG. 3 is a simplified block diagram of an example receive circuit in the WCD.

FIG. 3 is a simplified block diagram depicting how components in the WCD could be arranged in this manner. This diagram is intentionally simplified for ease of illustration. In practice, the WCD could include more or fewer components, and the configuration could be otherwise modified. Further, various illustrated downlink components could be interrelated with uplink circuitry as well, such as by use of suitable duplexers or the like.

As shown in FIG. 3, the WCD includes an antenna block (e.g., one or more antennas) 30, a bandpass filter 32, a cLNA 34, a splitter 36, a 4G LNA 38, and a 5G LNA 40. Downlink signals in this configuration would be received by the antenna block 30 and filtered by the bandpass filter 32. The cLNA could then build up the signals before they are split into two paths, one to the 4G LNA and the other to the 5G LNA. The 4G LNA could then build up downlink signals specifically for receipt by the 4G modem 22. And the 5G LNA could build up signals specifically for receipt by the 5G modem 24.

Note that this dual-stage arrangement advantageously provides the cLNA before the split in the RF receive chain. This configuration facilitates building up a potentially weak received signal before splitting the signal into two. The split itself may result in a 3 dB loss, which could result in impractically low receive sensitivity without first amplifying cell-edge signals or the like. Providing the cLNA before the RF receive chain split and providing the modem-specific LNAs after the split helps to solve this problem, allowing signal to be built up before being split, and then allowing the separate modems to adjust the receive signal strength respectively for their own purposes after the split.

In operation with this example 4G/5G arrangement, the 4G modem will determine when the device is operating in dual-connectivity (DC) mode (when 4G and 5G radio-link layer connections are established as discussed above, which the 4G modem could know as it is involve with setup of the 4G connection and is involved with or within a signaling path for setup of the 5G connection). In response to determining that the WCD is operating in the DC mode, the 4G modem could then turn on the cLNA and set the cLNA gain to a first predefined level M (e.g., 17 to 18 dB), through signaling over a MIPI bus for instance. The 4G and 5G modems will then separately control their respective modem-specific LNAs to help keep their respective receive signal strength at optimal levels.

If and when either modem is not receiving (e.g., is operating in discontinuous receive (DRX) mode and is inactive although technically still connected), that modem could turn off its respective modem-specific LNA to help conserve power.

Further, if and when either modem determines that its respective receive strength is threshold high (e.g., at least as high as a predefined threshold, perhaps resulting in saturation) and the modem has already reduced its respective modem-specific LNA gain to zero or cannot otherwise use its modem to overcome the saturation issue, then the modem could responsively signal to trigger a decrease of the cLNA gain. If the 4G modem encounters this situation with respect to the 4G receive signal strength, then the 4G modem could responsively signal over the MIPI bus to the cLNA to reduce the cLNA gain to a second predefined level N (e.g., 12 to 13 dB)—with level N preferably being lower than M but still sufficient to accommodate weak cell-edge receive signals. Whereas, if the 5G modem encounters this situation with respect to the 5G receive signal strength, then the 5G modem could responsively signal to the 4G modem, and the 4G modem could in turn responsively signal over the MIPI bus to the cLNA to reduce the cLNA gain to the second predefined level N.

In an alternative embodiment, the reduction of cLNA gain could be done iteratively in steps. But it may be quickest to simply drop the cLNA gain to a sufficiently low second predefined level.

Further, note the cLNA gain could be increased in a similar manner or could be automatically reverted to level M after a predefined period of time or in response to one or more other triggers.

In a representative implementation, when the WCD hands over from the common frequency band to another band, the 4G modem could responsively turn off the cLNA and the 4G LNA, and the 4G modem could also responsively signal to the 5G modem to cause the 5G modem to similarly turn off the 5G LNA. In turn, upon new entry of the WCD into the common frequency band, the 4G modem could newly turn on the cLNA and the 4G LNA and cause the 5G modem to turn on the 5G LNA, and the process can repeat.

Uplink Power-Reduction Issue

At issue on the transmit side is a need to ensure compliance with industry or government regulations regarding a WCD's maximum transmit power, to help avoid or minimize OOB emissions. As noted above, a technological problem in the dual-connectivity scenario is that the WCD's concurrent communication on two channels in a common band (by way of example) could combine to produce reverse intermodulation distortion (IMD) products, the transmission of which could be contrary to regulations.

Figure 4:
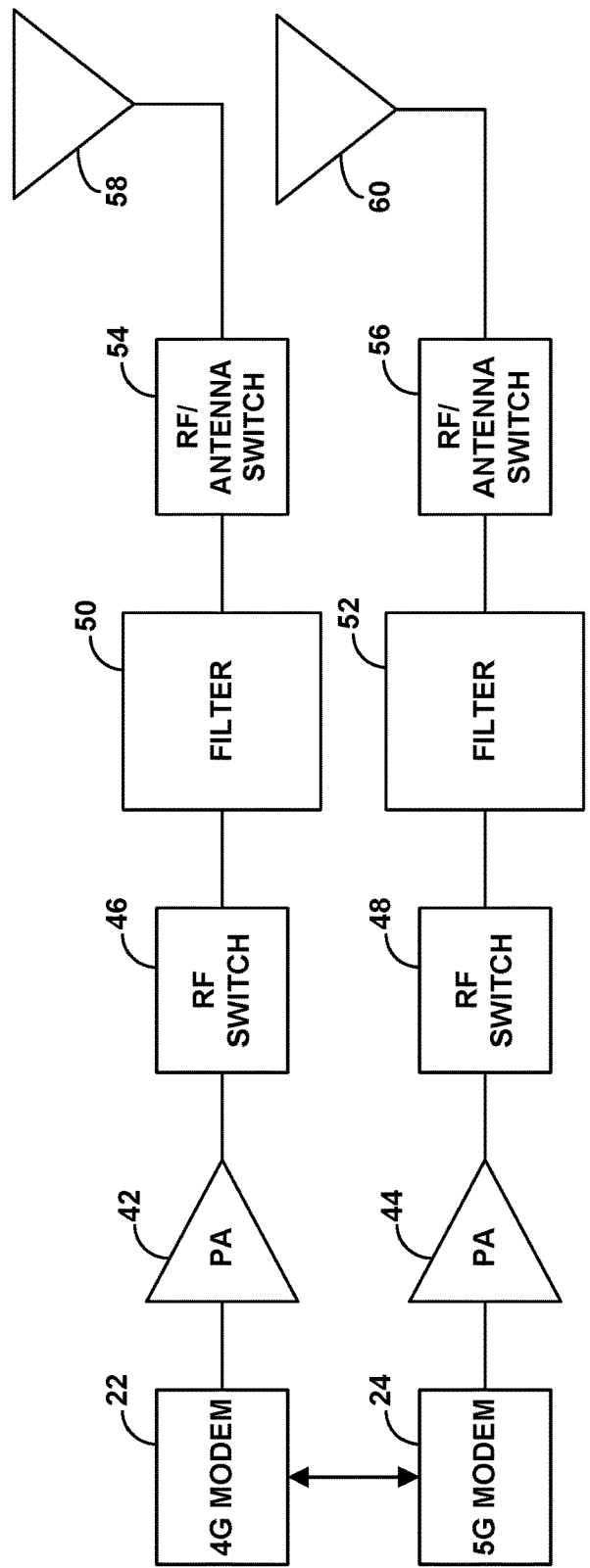
FIG. 4 is a simplified block diagram of an example transmit circuit in the WCD.

FIG. 4 is a simplified block diagram depicting how components in the WCD could be arranged to provide RF transmit chains for the WCD's two modems. As with FIG. 3, this diagram is intentionally simplified for ease of illustration. In practice, the WCD could include more or fewer components, and the configuration could be otherwise modified. Further, various illustrated downlink components could be interrelated with uplink circuitry as well, such as by use of suitable duplexers or the like.

As shown in FIG. 4, each modem's transmit chain includes a power amplifier (PA) 42, 44 an RF switch 46, 48, a bandpass filter 50, 52, an RF/antenna switch 54, 56, and an antenna block (e.g. one or more antennas) 58, 60. In practice, each modem could control its respective PA, to control its uplink transmission power.

As noted above, each modem in the example WCD may engage in an uplink power-control process by which the eNodeB evaluates uplink receive signal strength from the WCD and transmits PCCs to the WCD on a per-TTI basis. A PCC could direct the WCD to incrementally increase its transmission power or to incrementally decrease its transmission power.

However, industry or government regulations may limit a WCD's maximum transmission power separately for specific channels on which the WCD operates. For instance, regulations may specify the WCD's maximum output power on each carrier on which it will transmit and/or across multiple carriers on which it will transmit. Further, regulations may dictate a maximum power reduction (MPR) for the WCD to apply to further limit its maximum output power, with the MPR being based on factors such as the WCD's power class (e.g., per device type), the channel bandwidth and the allocated modulation order and quantity of PRBs per TTI. (For instance, the specified MPR could be greater for wider channel bandwidth, higher-order modulation, and/or greater number of allocated PRBs.)

Still further, regulations may necessitate application of additional MPR (A-MPR) in certain deployment scenarios, to further limit the WCD's maximum output power. In a single-air-interface scenario, the level of A-MPR could be established according to standard tables that are keyed to factors such as which band the WCD is operating on, the bandwidth of the channel on which the WCD is operating within that band, the number of PRBs allocated to the WCD in the TTI at issue, and what region of the channel bandwidth the allocated PRBs fall in.

In a dual-connectivity arrangement, however, one factor that can contribute to a prescribed extent of A-MPR is the interrelationship between (i) frequency resources on which the WCD transmits on one air interface protocol and (ii) frequency resources on which the WCD transmits on the other air interface protocol. Depending on the uplink frequency channel in use respectively on each air interface protocol, depending on how many PRBs are allocated for the WCD's use respectively on each air interface protocol, and depending on which PRBs are allocated (e.g., where they sit in the frequency spectrum), the WCD's concurrent transmission on the two air interface protocols could create reverse IMD products that are problematic. Therefore, the level of A-MPR that the WCD should apply for its transmission on a given one of the air interface protocols may depend not only on the PRBs allocated to the WCD on that air interface protocol but also the PRBs allocated for concurrent transmission by the WCD on the other air interface protocol.

To facilitate determining what A-MPR the WCD should safely apply for its transmission on a given one of the air interface protocols, the two modems in the device could share with each other information about which uplink PRBs are allocated to the WCD on a per-TTI basis. Further, each modem would know which uplink frequency channel it is using and which uplink frequency channel the other modem is using. For instance, the 4G modem could know which uplink frequency channel (carrier) the 5G modem is using, since RRC signaling through the 4G connection would have been used to establish the 5G connection. And the 4G modem could inform the 5G modem what uplink frequency channel (carrier) the 4G modem is using.

Unfortunately, however, this A-MPR evaluation may need to happen on a per-TTI basis (i.e., every millisecond), but it may not be possible for the two modems in the WCD to share with each other their respective PRB allocation information that frequently or quickly. Yet without the sharing of this information, at issue is how each modem could help ensure that it applies A-MPR to the extent necessary or desired in view of applicable regulations.

Uplink Power-Reduction Resolution

Per the present disclosure, in a WCD having multiple disparate air interface protocol modems operating concurrently on a common frequency band (for instance), each modem will determine the A-MPR to apply on its RF transmit path on a per TTI basis based on (i) its actual knowledge of the uplink frequency channels that it is operating on and of the uplink frequency channel that the other modem is operating on, (ii) its actual knowledge of the quantity and location of PRBs allocated for transmission on its own air interface protocol, and (iii) a presumption that allocated PRB quantity and location on the other air interface protocol's uplink frequency channel in the TTI at issue is the worst case possible, e.g., in terms of creating reverse IMD issues, given the situation on its own air interface protocol.

The idea here is that the modem at issue can assume the worst case scenario pairing of PRBs on its uplink frequency channel with PRBs on the other modem's uplink frequency channel.

In practice as noted above, each modem may include or have access to mapping data that specifies carrier pairings and, for each carrier pairing, PRB pairings and associated A-MPR. By reference to this data, the modem at issue can determine what the highest possible A-MPR is that the data specifies, given the known carrier pairing and given its own PRB allocation in the current TTI. Alternatively, the modem could make this determination algorithmically if appropriate. The modem could then apply that worst case A-MPR.

Such A-MPR mapping data could be established based on empirical testing of various pairings of carriers and PRBs, considering government regulations for limiting OOB emissions.

From the perspective of a given one of the modems, the mapping data could establish (i) whether the modem's uplink frequency channel and the other modem's uplink frequency channel could face an issue requiring A-MPR and (ii) for each of various PRB quantities/locations on the given modem's uplink frequency channel, whether there could be PRB quantity/allocation on the other modem's uplink frequency channel and what the maximum such A-MPR would be, i.e., for the worst-case pairing with PRBs on the other modem's uplink frequency channel.

With this data, for a TTI where the given modem has uplink PRB allocation, the given modem could first determine whether the frequency pairing at issue (its uplink frequency channel and the other modem's uplink frequency channel) might face a need for A-MPR (depending on the PRB quantity/location pairings). At issue here could be whether the mapping data establishes that the frequency pairing could require A-MPR and whether the other modem is active in the TTI (the latter of which could be established based on DRX cycle information provided in advance by the other modem).

If the given modem determines that the frequency pairing might face a need for A-MPR, then the given modem may determine what the maximum such A-MPR would be. Here, for various PRB quantities/locations on the given modem's uplink frequency channel, the mapping data could specify respective maximum A-MPR (assuming a worst case quantity/location of PRBs on the other modem's uplink frequency channel, in terms of IMD or the like).

Upon determining that maximum A-MPR, the given modem could then apply that maximum A-MPR, to further limit its maximum uplink transmission power.

CONCLUSION

Exemplary embodiments have been described above. Those skilled in the art will understand, however, that changes and modifications may be made to these embodiments without departing from the true scope and spirit of the invention.

We claim:

1. A method for dynamic control of dual-stage split amplification in a wireless communication device (WCD), wherein the WCD comprises at least two modems, including a first modem supporting wireless communication according to a first air interface protocol and a second modem supporting wireless communication according to a second air interface protocol, wherein the WCD further comprises a common radio-frequency (RF) receive chain shared by the two modems, the common RF receive chain including (i) a common set of antennas and filter for receiving downlink communications in a common frequency band on the first air interface protocol and the second air interface protocol and (ii) a common low-noise amplifier (LNA) (cLNA) for amplifying the received downlink communications, wherein the first modem is configured to control gain of the cLNA, wherein the WCD further comprises a splitter for splitting output from the common RF receive chain into a first path to the first modem and a second path to the second modem, wherein the WCD further comprises a first LNA in the first path, wherein the first modem is configured to control gain of the first LNA, and wherein the WCD further comprises a second LNA in the second path, the method comprising:

the second modem detecting (i) saturation of communications being received at the second modem via the second path and (ii) that adjustment of the second LNA is unable to overcome the saturation;

the second modem responding to the detecting by signaling to the first modem; and the first modem responding to the signaling by adjusting the gain of the cLNA to help overcome the detected saturation of communications being received at the second modem.

2. The method of claim 1, wherein adjusting the gain of the cLNA comprises reducing the gain of the cLNA from a predefined default gain level to a predefined reduced gain level.

3. The method of claim 1, further comprising:

the first modem adjusting gain of the cLNA in response to the first modem detecting (i) saturation of communications being received at the first modem via the first path and (ii) that adjustment of the first LNA is unable to overcome the saturation of communications being received at the first modem via the first path.

4. The method of claim 1, further comprising:

the first modem turning on the cLNA in response to the WCD operating in a dual-connectivity mode in which the first modem has a first radio-link connection with a first base station and the second modem has a second radio-link with a second base station.

5. The method of claim 1, further comprising:

the first modem turning off the cLNA in response to the WCD handing over from the common frequency band to another frequency band.

6. A wireless communication device (WCD) with dynamic control of dual-stage split amplification, the WCD comprising:

at least two modems, including a first modem supporting wireless communication according to a first air interface protocol and a second modem supporting wireless communication according to a second air interface protocol;

a common radio-frequency (RF) receive chain shared by the two modems, the common RF receive chain including (i) a common set of antennas and filter for receiving downlink communications in a common frequency band on the first air interface protocol and the second air interface protocol and (ii) a common low-noise amplifier (LNA) (cLNA) for amplifying the received downlink communications, wherein the first modem is configured to control gain of the cLNA;

a splitter for splitting output from the common RF receive chain into a first path to the first modem and a second path to the second modem;

a first LNA in the first path, wherein the first modem is configured to control gain of the first LNA; and a second LNA in the second path, wherein the second modem is configured to control gain of the second LNA, and wherein the second modem is configured to engage in signaling with the first modem to trigger adjustment by the first modem of the gain of the cLNA, wherein the second modem is configured to engage in the signaling with the first modem, to trigger the adjustment by the first modem of the gain of the cLNA, in response to the second modem detecting (i) saturation of communications being received at the second modem via the second path and (ii) that adjustment of the second LNA is unable to overcome the saturation.

7. The WCD of claim 6, wherein the adjustment of the gain of the cLNA comprises reducing the gain of the cLNA from a predefined default gain level to a predefined reduced gain level.

8. The WCD of claim 6, wherein the first modem is configured to turn off the cLNA in response to the WCD handing over from the common frequency band to another frequency band.

9. A wireless communication device (WCD) with dynamic control of dual-stage split amplification, the WCD comprising:

at least two modems, including a first modem supporting wireless communication according to a first air interface protocol and a second modem supporting wireless communication according to a second air interface protocol;

a common radio-frequency (RF) receive chain shared by the two modems, the common RF receive chain including (i) a common set of antennas and filter for receiving downlink communications in a common frequency band on the first air interface protocol and the second air interface protocol and (ii) a common low-noise amplifier (LNA) (cLNA) for amplifying the received downlink communications, wherein the first modem is configured to control gain of the cLNA;

a splitter for splitting output from the common RF receive chain into a first path to the first modem and a second path to the second modem;

a first LNA in the first path, wherein the first modem is configured to control gain of the first LNA; and a second LNA in the second path, wherein the second modem is configured to control gain of the second LNA, and wherein the second modem is configured to engage in signaling with the first modem to trigger adjustment by the first modem of the gain of the cLNA, wherein the first modem is configured to adjust gain of the cLNA in response to the first modem detecting (i) saturation of communications being received at the first modem via the first path and (ii) that adjustment of the first LNA is unable to overcome the saturation.

10. The WCD of claim 9, wherein the adjustment of the gain of the cLNA comprises reducing the gain of the cLNA from a predefined default gain level to a predefined reduced gain level.

11. The WCD of claim 9, wherein the first modem is configured to turn off the cLNA in response to the WCD handing over from the common frequency band to another frequency band.

12. A wireless communication device (WCD) with dynamic control of dual-stage split amplification, the WCD comprising:

at least two modems, including a first modem supporting wireless communication according to a first air interface protocol and a second modem supporting wireless communication according to a second air interface protocol;

a common radio-frequency (RF) receive chain shared by the two modems, the common RF receive chain including (i) a common set of antennas and filter for receiving downlink communications in a common frequency band on the first air interface protocol and the second air interface protocol and (ii) a common low-noise amplifier (LNA) (cLNA) for amplifying the received downlink communications, wherein the first modem is configured to control gain of the cLNA;

a splitter for splitting output from the common RF receive chain into a first path to the first modem and a second path to the second modem;

a first LNA in the first path, wherein the first modem is configured to control gain of the first LNA; and a second LNA in the second path, wherein the second modem is configured to control gain of the second LNA, and wherein the second modem is configured to engage in signaling with the first modem to trigger adjustment by the first modem of the gain of the cLNA, wherein the first modem is configured to turn on the cLNA in response to the WCD operating in a dual-connectivity mode in which the first modem has a first radio-link connection with a first base station and the second modem has a second radio-link with a second base station, wherein the first modem is configured to set the gain of the cLNA to a predefined default gain level, and wherein the first modem is configured to reduce the gain of the cLNA to a predefined reduced gain level in response to one or more of (i) the first modem detecting saturation of communications arriving at the first modem via the first path when the gain of the first LNA is already threshold low or (ii) the second modem detecting saturation of communications arriving at the second modem via the second path when the gain of the second LNA is already threshold low.

13. The WCD of claim 12, wherein the first modem is configured to turn off the cLNA in response to the WCD handing over from the common frequency band to another frequency band.

* * * * *